Nov. 3, 1964 T. F. HINES 3,155,212
COIN-ACTUATED DISPENSING AND CONTROLLING MACHINE
Filed Nov. 15, 1961 2 Sheets-Sheet 1
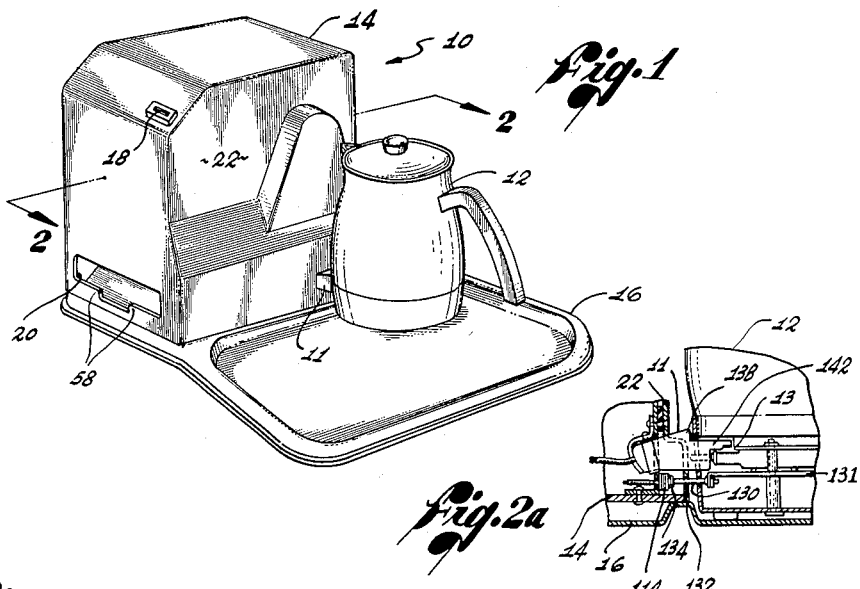
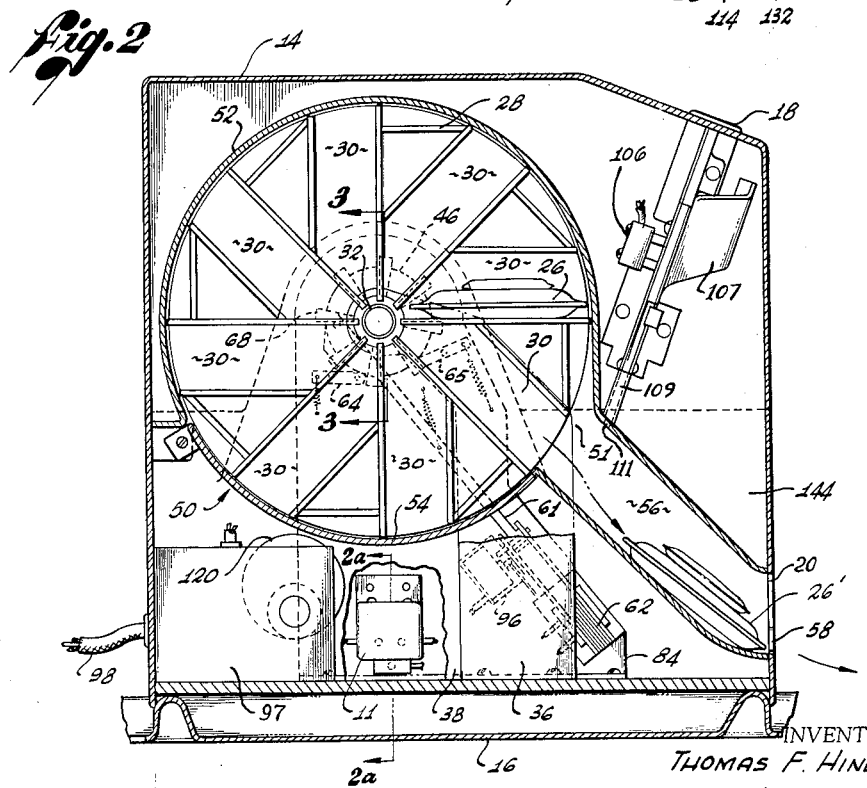
INVENTOR.
THOMAS F. HINES
ATTORNEYS

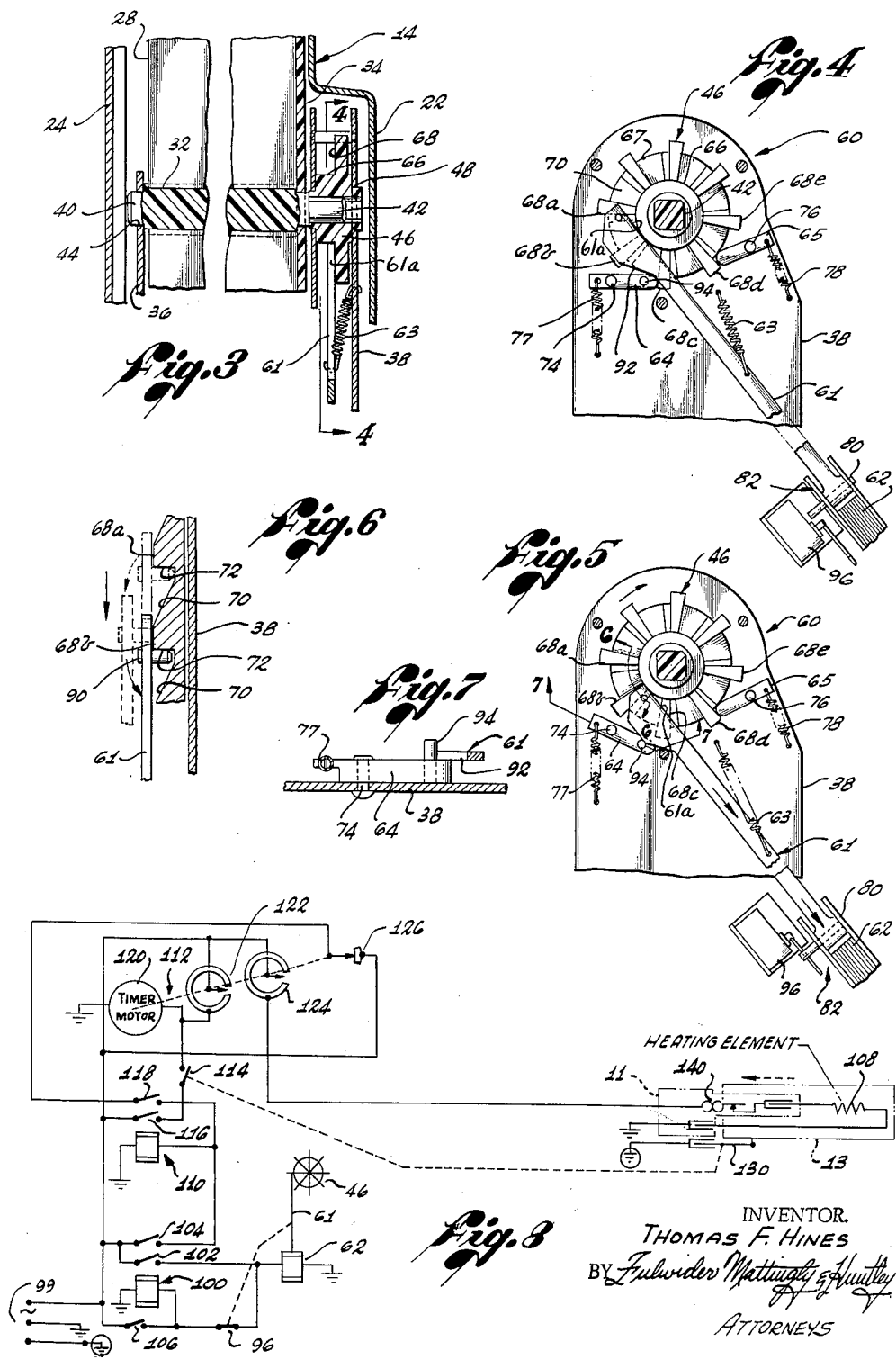

United States Patent Office 3,155,212
Patented Nov. 3, 1964

3,155,212
COIN-ACTUATED DISPENSING AND
CONTROLLING MACHINE
Thomas F. Hines, Arcadia, Calif., assignor to Brucof
Company, Arcadia, Calif., a co-partnership
Filed Nov. 15, 1961, Ser. No. 152,685
10 Claims. (Cl. 194—10)

This invention relates to coin-actuated dispensing and controlling machines, and more particularly to a machine of this type for dispensing a product and for controlling the power supplied to means having some relationship to the dispensed product.

The machine of the present invention constitutes an improvement over that disclosed in application Serial No. 763,033 of myself and Willis L. Wells, filed September 24, 1958, and now Patent No. 3,005,532.

One particularly useful embodiment of the invention is a coin-actuated machine for dispensing the ingredients and controlling the power supplied to a heating element for brewing a pot of coffee. It will be appreciated that such a machine has an extremely widespread potential use as, for example, in motel and hotel rooms and other such public places. Because of this particularly advantageous use, the machine of the invention is illustrated and described as especially constructed and arranged for this use. However, as will become apparent, there are other advantageous applications of the invention. Therefore, the illustration and the detailed description of this one is not intended to be limitative.

When adapted for use in the above specified manner, the machine is arranged for cooperative operation with a suitable heating element. As suggested above, the function of the machine is to dispense the ingredients and to control the power supplied in the element which, in turn, functions to heat the water to the temperature necessary to brew the coffee. In use, insertion of a coin of the proper denomination actuates the machine to dispense the coffee brewing ingredients. Simultaneously, an electrical circuit is conditioned, so that, at the will of the user, power is made available to operate the heating element for a predetermined period of time.

An important feature of the machine is that the time period during which power is available to operate the heating element, does not necessarily commence at the instant a proper coin is deposited. Rather, in addition to operating the dispensing mechanism, the deposited coin merely serves to condition a circuit, so that the initiation of the availability period is delayed until an independent switch is actuated. This controllable delay permits the user to make the necessary preparations for brewing the coffee.

In general, the preferred embodiment includes a case housing a rotary magazine with a plurality of receptacles for receiving the individual packages of dry ingredients. An electrically operated indexing mechanism mounted within the case operates, responsive to a coin of the proper denomination being deposited, to rotate the magazine to bring successive ones of the receptacles into dispensing position. Movement of the given receptacle into dispensing position causes the package originally stored therein to be delivered to a position from which it may be removed from the case through a discharge opening.

Simultaneously with the operation of the dispensing apparatus, an electrical circuit is conditioned for supplying current to a heating element. The heating element in the present case is electrically operated and incorporated as a part of the coffee pot. Mating plugs are provided on the machine and pot for electrically connecting the self-contained heating element of the pot to the above mentioned conditioned circuit. Switch means are provided in operative association with the plugs, so that when the pot is plugged into the machine, current from the conditioned circuit becomes available for a predetermined time period to energize the heating element and brew the coffee. As pointed out above, the period of current availability does not begin to run until it is initiated by the user. In this case, initiation takes place automatically upon plugging the pot into the machine. Thus, assuming the pot initially be disconnected from the machine, the user may take all the time desired to insert the ingredients in the pot and otherwise prepare for brewing the coffee.

A better understanding of the construction and operation of the machine of the invention, as well as an appreciation of the above and other features and advantages thereof, may be had by referring to the following detailed description taken in conjunction with the accompanying drawings in which:

FIGURE 1 is a perspective view of a dispensing and controlling machine constructed in accordance with the invention and showing a coffee pot with a self-contained electrical heating element connected to the machine for use in brewing coffee;

FIGURE 2 is a section view taken on the line 2—2 of FIGURE 1;

FIGURE 2a is a partial section taken on the line 2a—2a of FIGURE 2 and illustrating mating plugs on the machine and pot;

FIGURE 3 is a partial section taken on the line 3—3 of FIGURE 2;

FIGURE 4 is a partial section taken on the line 4—4 of FIGURE 3 and illustrating the indexing mechanism of the machine in its normal inoperative position, certain parts not shown in FIGURE 3 having been added in FIGURE 4 for reasons of clarity;

FIGURE 5 is a view similar to FIGURE 4, except that the indexing mechanism is shown at the midpoint of its operation of advancing the rotary magazine one angular increment;

FIGURE 6 is a partial section taken on the line 6—6 of FIGURE 5 with certain parts being shown in phantom lines in the positions occupied in FIGURE 4 and in the position occupied while moving from the position of FIGURE 4 to that of FIGURE 5;

FIGURE 7 is a partial section taken on the line 7—7 of FIGURE 5; and

FIGURE 8 is a schematic diagram of the electric circuitry of the machine of the invention, as well as that of the associated coffee pot.

Referring to the drawings, and in particular to FIGURE 1 thereof, the machine of the invention indicated generally by reference numeral 10, is shown with an electrically operated coffee pot 12 detachably connected thereto. Preferably, the pot 12 comprises a conventional percolator insofar as its internal construction is concerned. Connection is achieved by means of mating plugs 11 and 13 on the machine 10 and pot 12, respectively, as may be seen in FIGURE 2a.

The machine includes a case 14 housing the various parts. Secured to the bottom of the case and projecting forwardly and flaring slightly outwardly therefrom is a tray 16. The purpose of the tray 16 is to receive the pot 12 both when it is connected an disconnected from the machine, as well as other articles such as cups, spoons, and the like, thereby protecting the underlying furniture. Preferably, the case 14 and the tray 16 are constructed of a plastic material which is strong and durable, yet light in weight and pleasing in appearance. When constructed of such a plastic, these parts can conveniently be vacuum formed or injection molded into the desired shapes.

The case 14 is generally rectangular in overall shape and has a coin-receiving slot 18 and a discharge opening 20. The function of the slot 18 and the opening 20 will become apparent as the description proceeds. A front wall 22 is shaped as shown so as to provide space within the case 14 for mounting certain parts. In this regard, it mounts the plug 11 of the machine in such a manner that the mating plug 13 on the pot 12 is readily adapted to be connected thereto with the pot resting on the tray 16. A rear door 24 (FIGURE 3) is removably mounted on the case 14 to afford access to its interior. Under normal operating circumstances, a suitable key lock (not shown) is provided to maintain the door in its closed position and, hence, to prevent tampering with the machine.

Mounted within the case 14 is apparatus for dispensing packages 26 containing the coffee brewing ingredients other than the water. Such packages are illustrated in FIGURE 2 and commonly include portions of coffee, sugar, and powdered cream. Apparatus for controlling the power supplied to the pot 12 is likewise mounted within the case 14. The construction and operation of both the dispensing and the controlling apparatus is to be described hereinafter in detail.

In order to store the packages 26 of coffee brewing ingredients and to dispense them upon insertion of a proper coin, a wheel-like magazine 28 is provided. As may be seen in FIGURE 2, the magazine 28 is cylindrical in shape and has a plurality of individual storage receptacles 30 that extend generally outwardly from a central longitudinal shaft 32. Each of the receptacles 30 is open at its outer periphery for dispensing the package 26 stored therein and each is open at its rearward end to permit insertion of a package 26 when the rear door 24 is removed from the case 14. At their forward ends, the receptacles 30 are closed by an end plate 34 (FIGURE 3) on the magazine. Preferably, so as to facilitate the indexing or advancing of the magazine 28 to bring successive receptacles 30 into dispensing position, they are spaced at equi-angular intervals. Here, eight receptacles 30 are provided at 45° spacing from one another.

Rotatable mounting of the magazine 28 within the case 14 is achieved by means of a pair of laterally spaced brackets 36 and 38. As shown in FIGURES 2 and 3, the brackets 36 and 38 are secured to and project upwardly from the floor of the case. The central shaft 32 of the magazine 28 has forwardly and rearwardly projecting end portions 40 and 42, respectively, for mounting purposes. Referring to FIGURE 3, the rear end portion 40 is cylindrical in shape and is journalled in a cooperating bore in the bracket 36, as at 44. Bearing support is achieved at the opposite end of the shaft 32 by connecting the end portion 42 to a ratchet wheel 46 which, in turn, is journalled in a bore in the bracket 38, as at 48.

To maintain the stored packages 26 within their corresponding receptacles 30, a casing 50 extends around at least what then comprises the lower portion of the magazine 28, leaving open only a relatively small discharge space 51. In the present embodiment, the casing 50 is constructed in separate upper and lower sections 52 and 54 which encompass the entire periphery of the magazine 28, except for the discharge space 51. Besides serving this retaining function, the two sections cooperate to define the walls of a discharge chute 56 leading from the receptacle 30, then in dispensing position, to the discharge opening 20 of the case 14.

With the foregoing construction in mind, it will be understood, as the magazine 28 is rotated clockwise in FIGURE 2 in angular increments corresponding to their angular spacing, successive receptacles 30 will be brought into dispensing position. Moreover, as a given receptacle 30 is brought into this position, the stored package 26 will slide out under the influence of gravity and down the chute 56 to the position of the package 26' in FIGURE 2. Rather than permitting the dispensed package 26' to drop completely out of the machine, the side wall of the case 14 is formed with a pair of spaced flanges 58 that project upwardly into the discharge opening 20 and function as a stop for the package 26'. The flanges 58 are spaced apart to leave an opening so that the user can easily grasp the package and remove it, when so desired.

Since in the present case the individual receptacles are spaced at 45° angles, magazine rotation of this same angular extent is required to bring successive receptacles into dispensing position.

For reasons of simplicity of operation from the user's standpoint, it is desirable that the magazine 28 be automatically indexed or rotated upon depositing a coin of the proper denomination. That is, in the preferred operation, the user merely deposits the coin in order to receive his package 26 of ingredients. To achieve this desired end, a solenoid-operated indexing mechanism 60 is provided in cooperation with the magazine 28. The mechanism 60 is constructed and arranged so that when the proper coin is deposited, an electrical circuit is activated to operate the same. In operation, the magazine 28 is released from its original position and indexed or advanced one angular increment to bring the next succeeding receptacle 30 into dispensing position. A further function of the indexing mechanism 60 is to lock the magazine 28 in position after each sequence of operation for obvious reasons.

The indexing mechanism 60 includes basically indexing arm 61 operable in conjunction with the ratchet wheel 46. A solenoid 62 operates the arm 61 in one direction against the resistance of a spring 63. A pair of pawls 64 and 65 engage the ratchet wheel 46 and function to releasably lock the magazine 28 in each successive dispensing position.

Referring to FIGURE 4, the ratchet wheel 46 has a hub 66 centrally bored for the reception of the end portion 42 of the shaft 32 in a drive fit. As previously discussed, the shaft 32 and the wheel 46 are necessarily connected so as to prevent relative rotation. Such connection here is made by forming the end portion 42 and the bore in mating rectangular configurations. Besides preventing relative rotation, such a connection facilitates angular alignment of the magazine 28 and wheel 46, when the two are assembled.

The ratchet wheel 46, in addition to the hub 66, has an intermediate annular flange 67 and a plurality of angularly spaced and radially extending teeth 68. As illustrated, the teeth project outwardly of the peripheral edge of the flange 67. The number of teeth 68 corresponds to the number of receptacles 30 of the magazine 28 and, similarly, the angular spacing of adjacent teeth 68 is equal to the spacing of adjacent receptacles 30. Since there are eight receptacles 30 at angular spacings of 45°, there are likewise eight ratchet teeth 68 at angular spacings of 45°. For convenience of description, each of the succeeding teeth 68 carries an alphabetical subscript beginning with "a" for the tooth corresponding to the receptacle 30 in dispensing position.

Particular reference is made to FIGURE 6, where it may be seen that a tapered cam surface 70 is provided on the flange 67 between each pair of adjacent teeth 68. The cam surface 70 slopes or tapers upwardly from a location adjacent a shoulder 72 on the trailing side of one tooth to the uppermost surface of the next succeeding tooth, it being understood that the wheel 46 is rotated in a clockwise direction in FIGURE 4 in advancing the magazine. When the ratchet wheel 46 is mounted for use, the hub 66 is journalled in a bore 48 in the bracket 38, as previously described, and its back side rotates adjacent the bracket 38 with the teeth 68 and cam surfaces 70 facing toward the rear of the case 14. The close proximity of the wheel 46 and the mounting bracket 38 is used to advantage, as certain of the cooperating parts of the indexing mechanism 60 are mounted on that bracket.

The pawls 64 and 65 are both pivotally mounted on the bracket 38, as at 74 and 76, respectively. A tension spring 77 connected at its opposite ends to the pawl 64 and the bracket 38 functions to urge that pawl against the peripheral edge of the flange 67. Since the teeth 68 of the ratchet wheel 46 project slightly outwardly beyond the peripheral edge of the flange 67, the leading edge of the tooth 68c abuts the pawl 64 and further advance rotation of the wheel 46 is temporarily prevented. In a similar manner, retrograde rotation of the wheel 46 is prevented by the pawl 65. A spring 78 urges the pawl 65 into engagement with the peripheral edge of the flange 67, so that it abuts trailing edge shoulder 72 of the next tooth 68d.

It will be appreciated that when the pawls 64 and 65 are in the positions shown in FIGURE 4, the wheel 46 and, hence, the magazine 28 is releasably held against rotation. Between periods of use, the pawls 64 and 65 occupy these positions.

The indexing arm 61 serves the dual function of camming the pawl 64 out of interference with the adjacent tooth 68c and of the advancing wheel 46. The arm 61 is pivotally connected at its lower end to the solenoid 62, as at 80. The pivotal axis of the arm 61 is oriented transverse to its longitudinal axis. The solenoid 62, in turn, is part of an assembly 82 secured by means of a bracket 84 (FIGURE 2) to the floor of the case 14. As illustrated in FIGURE 4, the arm 61 extends generally transverse to the axis of rotation of the wheel 46 and is arranged for longitudinal movement between the positions shown in FIGURES 4 and 5. During the course of such longitudinal movement, the arm 61 also pivots slightly toward and away from the opposed surface of the wheel 46, as will be explained.

The tension spring 63 is connected at the opposite ends to the bracket 38 and to the arm substantially at its midpoint and urges the arm upwardly toward its position of FIGURE 4 and forwardly toward the bracket 38 into engagement with the opposed surface of the wheel. By virtue of being slightly offset from the longitudinal axis of the arm 61, the spring 63 also urges the arm inwardly toward the central axis of the wheel 46 into engagement at its straight edge surface 61a with the hub 66. Sufficient play is provided in the pivotal connection at 80 to give the arm the necessary freedom to insure that it so engages.

Movement of the arm 61 downwardly against the action of the spring 63 is accomplished by the solenoid 62, as suggested above. A follower pin 90 mounted on the upper end of the arm 61 rides along the cam surface 70 of the stationary wheel during such downward arm movement. Referring to FIGURE 6, the engagement of the follower pin 90 with the cam surface 70 causes the arm 61 to be pivoted rearwardly away from the cam surface, as shown in phantom lines. When the pin has moved completely across the surface of the next succeeding tooth 68b, it drops behind that tooth, as shown in full lines in FIGURE 6.

During downward movement of the arm 61 under the influence of the solenoid 62, a cam surface 92 on one edge of the arm 61 engages a follower pin 94 projecting outwardly from the pawl 64 to cam the latter out of interference with the tooth 68c. As shown in FIGURE 5, with the pawl 64 clear of the projecting portion of the associated tooth 68c, the wheel 46 is free for advance rotation. Rotation in the opposite direction is prevented by the pawl 65.

At the instance the arm 61 has moved down sufficiently, so that the pin 90 drops behind the tooth 68b, i.e. to the position shown in full lines in FIGURE 6, the solenoid 62 is de-energized. A switch 96, included as a part of the assembly 82, is mechanically tripped momentarily to its open position to achieve this desired result. With the solenoid de-energized, the spring 63 urges the arm 61 upwardly to its position of FIGURE 4. Since the wheel is free for advance rotation and since the pin 90 abuts the shoulder 72 on the tooth 68b, the wheel is rotated or advanced one angular increment. As this advancement takes place, the pawl 64 is spring-urged back to its original position, so as to abut the leading edge of the next tooth 68d and limit the wheel movement to one angular increment. Also, during this wheel advancement, the ratched tooth 68e cams the pawl 65 outwardly, as it moves to its next position. Once, the tooth 68e is past the pawl, the latter drops behind that tooth and again serves to prevent retrograde rotation.

The circuit for energizing the solenoid 62 to operate the indexing mechanism 60 and to control the power supplied to the pot 12 is shown in the schematic diagram of FIGURE 8. It will be understood that the various electrical components to be described are mounted within the case 14. Moreover, unless specifically indicated otherwise, they are located within a housing 97, illustrated in FIGURE 2, secured to the floor of the case 14.

Power is supplied to the machine by a cord 98 extending from the case 14 to a conventional 110 volt A.C. supply 99. The power supply 99 is connected to the coil of a starting relay 100 having two sets of contacts 102 and 104 through a coin-actuated switch 106. Power is also supplied through the coin-actuated switch to the solenoid 62 through the normally closed solenoid switch 96. It may also be seen, when the relay contacts 102 are closed, power is supplied to energize the solenoid and also through the switch 96 to energize the relay 100.

The coin-actuated switch 106 is mounted in the case 14 immediately below the coin-receiving slot 18 and is adapted to close momentarily upon reception of a coin of the proper denomination. Upon switch actuation, the starting relay 100 is energized to close its contacts 102 and 104, and simultaneously power is supplied to energize the solenoid 62. Although the coin-actuated switch 106 opens almost immediately the starting relay 100 is locked in circuit through its contacts 102 and through the normally closed solenoid switch 96. Thus, power continues to be supplied to energize the solenoid 62, notwithstanding the fact that the coin-actuated switch 106 opens.

As disclosed above, when the solenoid 62 has moved the indexing arm 61 the requisite distance, the solenoid switch 96 is mechanically tripped momentarily to its open position. This causes the starting relay 100 to drop out of the circuit and results in de-energizing of the solenoid 62.

To the extent described, the circuit has been for the operation of the indexing mechanism. That is to say, the remaining portion of the circuit of FIGURE 8 is concerned with the controlling of power supplied to energize a self-contained heating element 108 of the pot 12. Considering now this controlling function, the circuit of the machine also embodies a conditioning relay 110, a timer 112, and a normally open plug-actuated switch 114. The relay 110 has two sets of normally open contacts 116 and 118, whereas the timer 112 embodies a motor 120, two initially open switches 122 and 124, and an initially closed switch 126.

One set of contacts 116 of the conditioning relay 110 are connected at one side to the power supply 99 and on the other side to the plug-actuated switch 114 which, in turn, is in series with the timer motor 120. The other set of contacts 118 are connected on one side to the coil of the relay 110 and on the other to the power supply 99 through the initially closed switch 126 of the timer. With reference to the two initially open timer switches 122 and 124, the former is connected on its opposite sides to the power supply 99 and the timer motor 120, and the latter to the power supply 99 and to the pot-connecting plug 11.

With this circuit arrangement, it may be seen that upon closing of the contacts of the starting relay 100, and in particular upon closing of the contacts 104, the conditioning relay 110 is energized and locked in circuit with the power supply 99 through its contacts 118. Voltage is then applied to the open contacts of the switch 114, but so long as the switch is open, timer operation does not begin. Moreover, since the timer switch 124 does not close until the motor 120 has operated for a short period, current is not yet available at the plug 11 to energize the heating element of the pot 12.

As previously noted, the conditioning relay 110 is locked in through its own contacts 118, thus it remains energized even though the starting relay 100 drops out after the required solenoid operation has taken place. For purposes of description, it is considered that under these circumstances, the circuit for supplying current at the plug 11 for energizing the heating element 108 is now conditioned for such operation.

Closing of the switch 114 causes the timer motor 120 to run, thereby initiating a cycle of operation. At the beginning of the timer cycle, the switches 122 and 124 close, and shortly thereafter the switch 126 opens. Closing of switch 122 causes the motor 120 to be energized through that switch directly from the power supply. Relative to the switch 124, its closing results in current being made available at the plug 11 to operate the pot 12. On the other hand, opening of the switch 126 removes the energizing source of the conditioning relay 110 (assuming the relay 100 to have previously dropped out of circuit, whereupon it is deenergized and its contacts 116 and 118 open. However, as mentioned immediately above, the timer motor 120 is now energized through its switch 122, so that timer operation continues.

A timer cycle is arranged in the case of the illustrative embodiment to take approximately 15 minutes which is ample time to brew one pot of coffee but insufficient to completely brew any more. In this connection, it is to be noted that if the plug-actuated switch 114 is opened while the timer 112 is operating, the timer nevertheless continues to operate until the end of its cycle. This is an advantageous feature of the machine, since depending upon the particular user, the full time period may not be utilized, yet it is desired that the machine be left in readiness for the next user.

Near the end of the timer cycle, the switch 126 closes, and shortly thereafter the switches 122 and 124 open. Operation of the timer motor 120 ceases upon opening of the switch 122. Likewise, the period of current availability at the plug 11 terminates when the switch 124 opens. With these timer switches in the last mentioned positions, a given cycle is completed and the machine stands in readiness for a subsequent use.

In order to simplify the operation of the machine as greatly as possible, it is desired that the switch 114 be closed automatically upon plugging of the pot 12 into the machine. To achieve this desirable result, the switch 114 is mounted in the front wall 22 of the case 14 adjacent the plug 11 and in operative association with the mating plug 13 of the pot. Referring to FIGURE 2a, the pot 12 is modified from the useual two-prong or two pin plug 13 to include a third pin 130. This third pin 130 is arranged so that upon plugging of the pot into the machine, it projects through a bore 132 in the front wall of the case and engages an actuating member 134 of the switch 114. In this position, the pin 132 serves a dual purpose of closing the switch 114 and of grounding the pot chassis to the machine. Grounding may be achieved by making the pin 130 and the external portions of the switch 114 conductive so that when physical contact is made a grounding circuit is established. As shown in FIGURE 2a, the pin 130 is attached to a conductive member 131 to which the pot is grounded. The external portions of the switch are in turn grounded to the machine either through its mounting means or through a wire (not shown).

The plug 11 embodies a housing 138 projecting from the front wall 22 of the case 14. Mounted within the housing 138 are a pair of standard sockets or female connectors for receiving the projecting pair of pins on the mating plug 13. When the plugs 11 and 13 are connected, as in FIGURE 2a, the heating element 108 of the pot is in series with the power supply 99 through the timer switch 124, as may be seen in FIGURE 8. Thus, when the timer 112 is operating and the switch 124 is closed, the heating element 108 is energized by the power supply 99.

In addition to mounting the sockets, the plug housing 138 preferably mounts a normally closed thermostatic switch 140 in series with the timer switch 124 and heating element 108. The sensing element (not shown) of the thermostatic switch 140 is positioned within the projecting forward portion 142 of the housing and functions in the manner well known in the art to open the switch 140 and break the energizing circuit when the pot 12 reaches a predetermined temperature. Since the construction and arrangement of this thermostatic switch 140 itself are well known and do not form a part of the present invention, they are not described in further detail.

To prepare the machine for use, it is connected by means of the cord 98 to a conventional 110 volt A.C. power supply 99. Assuming that the magazine 28 is initially empty, the door 24 of the case is removed and packages 26 of ingredients are inserted from the rear to all receptacles 30, except for the one aligned with the discharge chute 56. With the magazine 28 thus loaded, the cover 24 is replaced and locked in position. To take full advantage of all operating features of the machine, the pot 12 is necessarily detached from the machine 10 at this stage. In passing, it is noted that since the pot will normally have been cleansed following the previous uses, it normally would be left detached from the machine and resting on the tray 16.

To commence operation, the user simply deposits a coin of the proper denomination in the coin-receiving slot 18 on the case 14. This deposited coin momentarily closes the coin-actuated switch 106, resulting in energization of the starting relay 100 and of the solenoid 62. The switch 106 is constructed and arranged so that coins accepted pass through a chute 107 and deposited within the case 14 in the space 144 between the side wall of the case and the top of the discharge chute. On the other hand, rejected coins drop downwardly through a coin passageway 109 and then into the discharge chute 56 through a slot 111 in the top wall thereof. Such rejected coin may be recovered by the user through the opening 20. Various switches of conventional design available on the market are capable of carrying out the desired function. Since the construction of the switch 106 forms no part of the present invention, it is not described in further detail.

The energized solenoid 62 functions to pull down the indexing arm 61 against the resistance of its spring 63. When the arm 61 is pulled down sufficiently, so that the follower pin 90 drops behind the shoulder 72 on the next succeeding ratched tooth 68, the normally closed solenoid switch 96 is momentarily actuated to its open position. This switch actuation breaks the circuit to the coil of the starting relay and results in de-energizing of that relay and, in turn, in de-energizing of the solenoid 62. This permits the spring 63 to urge the arm 61 back to its original position of FIGURE 4, thereby advancing the ratched wheel 46 and the magazine 28 one angular increment. As a consequence of this advancement, the next succeeding receptacle 30 of the magazine 28 is brought to dispensing position and the package stored therein slides down to the bottom of the chute 56, so that it may be removed from the case 14 through the opening 20 by the user.

As soon as the contacts 104 of the starting relay 100 are actuated to a closed position, the conditioning relay 110 is also energized. This latter relay locks itself in circuit through its own contacts 118 and thus remains energized even after the relay 100 drops out. At this stage, the circuit for energizing the heating element 108 of the pot 12 is conditioned for operation, yet the timer 112 has not started its cycle of operation, nor has current been made available at the plug 11. Moreover, no further operation of the machine takes place, until the user plugs in the pot 12 to the machine. Thus, the necessary preparations for brewing the coffee are now made with the user being free to take all the time necessary.

After the necessary preparations have been made, the pot 12 is plugged into the machine. This action closes the switch 114 and initiates a cycle of timer operation. Shortly after such initiation, power is made available at the plug 11 for energizing the heating element. At essentially the same time, the time motor 120 is energized through its own switch 122 and the relay 110 drops out by virtue of the opening of the timer switch 126.

Power is supplied to the heating element 108 of the pot 12 until the same is heated sufficiently to brew the coffee, at which time the thermostatic switch 140 breaks the circuit to de-energize the element. The user then normally disconnects the pot from the machine for obvious reasons, and the operation is complete from his standpoint. Disconnecting the pot from the machine at any time results in opening of the switch 114. However, as described above, once the switch 114 is initially actuated to a closed position and the timer motor 120 runs for a brief interval, it is energized through its own switch 122 and, hence, runs continuously until completion of a given cycle. That is to say, once the switch 114 is actuated, current is then available to energize the heating element for a predetermined period, which is of sufficient duration to permit the user to completely brew only one pot of coffee, irrespective of subsequent connecting and disconnecting of the pot 12 to the machine. Therefore, the user is for all practical purposes limited to one pot of coffee per deposited coin, and the machine automatically readies itself for a subsequent user.

It will be appreciated that there is provided a machine which is highly effective in both dispensing the ingredients to be used in brewing coffee and in controlling the power supplied for brewing the same. An important feature of the machine is that the operator need not actuate auxiliary controls or the like to carry out the operation. To the contrary, all that is necessary in order to receive a package of ingredients is to deposit a proper coin in the coin-receiving slot. Then, in the preferred embodiment, in order to initiate the period of current availability for energizing the heating element of the pot, the latter is merely plugged into the machine.

Another advantageous feature of the present machine is that the period during which current is available to energize the pot-heating element does not necessarily commence upon depositing of the proper coin. Rather, it is delayed to give the user time to make the necessary preparations and then commences at his instigation, which is here automatically upon plugging in of the pot. Furthermore, the machine is constructed and arranged so that even if the pot is removed from the machine at any point during the cycle of operation, the timer runs out so that the machine is prepared for a subsequent user.

Although one embodiment of the invention has been illustrated and described in detail, it will be understood that this was only by way of example and that numerous changes in the details of the construction and arrangement may be made without departing from the spirit and scope of the invention.

I claim:

1. A coin-actuated machine for dispensing ingredients to be cooked and controlling power supplied to means for cooking the ingredients, said machine comprising: a case having a coin-receiving slot, a discharge opening, and a door for affording access to the interior thereof; a shaft rotatably mounted in said case; a magazine secured to said shaft and having a plurality of angularly spaced receptacles for storing the ingredients, said receptacles being adapted upon shaft rotation in a given direction and in angular increments equal to the spacing of said receptacles to be brought successively into dispensing position, wherein the ingredients stored therein are made accessible exteriorly of said case for removal through said discharge opening; an indexing mechanism mounted within said case and operable to successively rotate said shaft in said direction and in said angular increments; an electrical circuit for supplying power to the cooking means, said circuit normally being inactive; means responsive to the reception of a coin of given denomination in said slot for operating said indexing mechanism and for conditioning said circuit for supplying power to the cooking means; switch means actuated by connection of the cooking means to said circuit for activating said circuit when it is so conditioned for supplying power to the cooking means; and timer means operable upon initial activation of said circuit to limit the time period during which said circuit is activated for supplying power to the cooking means.

2. A coin-actuated machine for dispensing ingredients to be cooked and controlling the power supplied to means for cooking the ingredients, said machine comprising: a case having a coin-receiving slot and a discharge opening; a magazine movably mounted within said case and having a plurality of receptacles adapted to be brought successively into dispensing position, wherein the ingredients stored therein are made accessible exteriorly of said case for removal through said discharge opening; an indexing mechanism mounted within said case and actuatable to move said magazine to bring successive ones of said receptacles into dispensing position; an electrical circuit for energizing the cooking means, said circuit normally being inactive; electrically operated means triggered by deposit of a coin of given denomination through said coin-receiving slot to actuate automatically said indexing mechanism to bring the next successive receptacle into dispensing position and to condition automatically said circuit for supplying power to the cooking means; normally open switch means in said circuit actuatable at the will of the user for activating said circuit when it is so conditioned for energizing the cooking means; and timer means in said circuit for limiting the period during which said circuit is activated for energizing the cooking means.

3. A coin-actuated machine for dispensing ingredients to be cooked and controlling the power supplied to means for cooking the ingredients, said machine comprising: a case having a coin-receiving slot, a discharge opening, and a door for affording access to the interior thereof; a magazine movably mounted within said case and having a plurality of receptacles adapted to be brought successively into dispensing position; means mounted in said case forming a chute extending between the receptacle in dispensing position and said discharge opening in said case; an indexing mechanism mounted within said case and successively operable to bring successive ones of said receptacles into dispensing position and to releasably lock said magazine as each receptacle is brought to dispensing position; a solenoid for operating said indexing mechanism; a first electrical circuit for energizing said solenoid, said first circuit normally being inactive; a second electrical circuit for making power available to energize the cooking means, said second circuit normally being inactive; switch means mounted in said case and responsive to the reception of a coin of given denomination deposited through said coin-receiving slot for activating said first circuit to energize said solenoid and for conditioning said second circuit for making power available to energize said cooking means; normally closed switch means in said first circuit responsive to operation of said indexing mechanism to de-energize said solenoid; normally open switch means in said second circuit actuatable at the will of the user for activating said second circuit when it is so conditioned to make power available for energizing the cooking means; and timer means in said second circuit for limiting the time period during which said second circuit is activated.

4. The subject matter of claim 3 further characterized in that said timer means commences operation upon such actuation of said normally open switch means.

5. The subject matter of claim 4 further characterized in that said timer means includes a normally upon switch in said second circuit, said last mentioned switch being closed near the beginning and opened at the end of the cycle of said timer means, whereby current is supplied to operate said timer means until the completion of its cycle irrespective of the opening of said normally open switch means during the cycle.

6. A coin-actuated machine for dispensing ingredients to be cooked and controlling the power supplied to means for cooking the ingredients, said machine comprising: a case having a coin-receiving slot, a discharge opening, and a door for affording access to the interior thereof; a shaft rotatably mounted in said case; a cylindrical magazine secured to said shaft in coaxial relationship and having a plurality of angularly spaced receptacles for storing the ingredients, said magazine being advanced, upon shaft rotation in one direction and in angular increments equal to the spacing between corresponding receptacles to bring successive ones of said receptacles into dispensing position; a ratchet wheel secured to said shaft and having a plurality of angularly spaced ratchet teeth, the number and the angular spacing of said teeth corresponding to the number and angular spacing of said receptacles; an indexing arm movably mounted in said case in operative association with said ratchet wheel, said arm being movable between first and second positions to engage successive teeth of said ratchet wheel and rotate said shaft; a solenoid for moving said arm from its first to its second position; spring means urging said arm from its second toward its first position; means responsive to movement of said indexing arm to its second position to de-energize said solenoid; means mounted in said case and operatively associated with said wheel for preventing rotation of said shaft in the opposite direction; releasable means mounted in said case and operatively associated with said wheel for preventing rotation of said shaft in said one direction when said magazine is positioned with any one of said receptacles in dispensing position, said last mentioned means being released by virtue of movement of said indexing arm to free said shaft for rotation in said one direction and of one angular increment; means for supplying power to operate the cooking means, power normally being unavailable from said last mentioned means for so operating the cooking means; means responsive to the reception of a coin of given denomination deposited through said coin-receiving slot for energizing said solenoid and for conditioning said power supply means for operating the cooking means; switch means connected to said power supply means and actuatable at the will of the user for making power from said power supply means available for operating the cooking means; and timer means connected to said power supply means and said switch means for limiting the time period during which power is available.

7. In a coin-actuated dispensing and controlling machine, apparatus for dispensing stored packages, said apparatus comprising: a case having a coin-receiving slot and a discharge opening; a shaft rotatably mounted in said case; a cylindrical magazine secured to said shaft in coaxial relationship and having a plurality of angularly spaced receptacles for storing the packages, said magazine being advanced, upon shaft rotation in one direction and in angular increments equal to the spacing between corresponding receptacles, to bring successive ones of said receptacles into dispensing position; a ratchet wheel secured to said shaft and having a plurality of angularly spaced ratchet teeth, the number and the angular spacing of said teeth corresponding to the number and angular spacing of said receptacles; an indexing arm movably mounted in said case in operative association with said ratchet wheel, said arm being movable betwen first and second positions to engage successive teeth of said ratchet wheel and rotate said shaft; a solenoid for moving said arm from its first to its second position; spring means urging said arm from its second toward its first position; means responsive to the reception of a coin of given denomination deposited through said coin-receiving slot for energizing said solenoid; means responsive to movement of said indexing arm to its second position to de-energize said solenoid; means mounted in said case for preventing rotation of said shaft in the opposite direction; and releasable means mounted in said case for preventing rotation of said shaft in said one direction when said magazine is positioned with any one of said receptacles in dispensing position, said last mentioned means being released by virtue of movement of said indexing arm to free said shaft for rotation in said one direction and of one angular increment.

8. The subject matter of claim 7 further characterized in that said shaft is rotated as aforesaid during movement of said indexing arm from its second to its first position.

9. A coin actuated machine for dispensing ingredients to be cooked and controlling the power supplied to means for cooking the ingredients, said machine comprising:
  a case having a coin-receiving slot and a discharge opening;
  a magazine movably mounted within said case and having a plurality of receptacles for storing the packagents to be dispensed, said magazine being adapted to be advanced to bring successive ones of said receptacles into dispensing position, wherein the packages to be dispensed, said magazine being adapted said case for removal through said discharge opening;
  an indexing mechanism mounted within said case and actuatable to advance said magazine;
  an electrical circuit adapted for detachable connection to the cooking means for energizing the same, said circuit normally being inactive;
  electrically operated means triggered by deposit of a coin of given denomination through said coin-receiving slot to actuate automatically said indexing mechnism to bring the next successive receptacle into dispensing position and to condition automatically said circuit for supplying power to the cooking means;
  means responsive to connection of the cooking means to said circuit for activating said circuit;
  and means connected to said circuit for limiting the period in which it is activated.

10. For use with a pot having a self-contained electrical heating element and a first plug electrically connected to said element, a coin actuated machine for dispensing ingredients to be cooked and for controlling power supplied to said heating element, said machine comprising:
  a case having a coin-receiving slot and a discharge opening;
  a magazine movably mounted within said case and having a plurality of receptacles adapted to be brought successively into dispensing position, wherein the ingredients stored therein are made accessible exteriorly of said case for removal through said discharge opening;
  an indexing mechanism mounted within said case and actuatable to move said magazine to bring successive ones of said receptacles into dispensing position;
  a normally inactive electrical circuit for energizing said heating element;
  electrically operated means triggered by deposit of a coin of given denomination through said coin-receiving slot to actuate automatically said indexing mechanism to bring the next successive receptacle into dispensing position and to condition automatically said circuit for supplying power to said heating element;
  a second plug on said case connected to said circuit and adapted for detachable connection to said first plug, said circuit being activated upon connection of said first and second plugs to energize said heating element;
  and means connected to said circuit for limiting the period in which it is activated.

References Cited in the file of this patent
UNITED STATES PATENTS

| 2,908,791 | Torino | Oct. 13, 1959 |
| 3,005,532 | Hines | Oct. 24, 1961 |

UNITED STATES PATENT OFFICE
CERTIFICATE OF CORRECTION

Patent No. 3,155,212                                November 3, 1964

Thomas F. Hines

It is hereby certified that error appears in the above numbered patent requiring correction and that the said Letters Patent should read as corrected below.

Column 10, line 74, for "upon" read -- open --; column 11, line 67, for "betwen" read -- between --; column 12, lines 18 and 19, for "packagents" read -- packages --; line 22, strike out "to be dispensed, said magazine being adapted" and insert instead -- stored therein are made accessible exteriorly of --.

Signed and sealed this 13th day of April 1965.

SEAL)
Attest:

ERNEST W. SWIDER                               EDWARD J. BRENNER
Attesting Officer                                    Commissioner of Patents